(12) United States Patent
Björn

(10) Patent No.: US 11,844,308 B2
(45) Date of Patent: Dec. 19, 2023

(54) MEANS FOR ADJUSTING CUTTING HEIGHT OF A POWERED LAWN MOWER

(71) Applicant: HUSQVARNA AB, Huskvarna (SE)

(72) Inventor: Jonathan Björn, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 112 days.

(21) Appl. No.: 17/363,960

(22) Filed: Jun. 30, 2021

(65) Prior Publication Data

US 2022/0000020 A1   Jan. 6, 2022

(30) Foreign Application Priority Data

Jul. 6, 2020   (SE) .................................... 2050846-1

(51) Int. Cl.
| | |
|---|---|
| A01D 34/74 | (2006.01) |
| A01D 34/00 | (2006.01) |
| A01D 34/76 | (2006.01) |
| A01D 101/00 | (2006.01) |

(52) U.S. Cl.
CPC ........... *A01D 34/74* (2013.01); *A01D 34/008* (2013.01); *A01D 34/76* (2013.01); *A01D 2101/00* (2013.01)

(58) Field of Classification Search
CPC ....... A01D 34/74; A01D 34/008; A01D 34/76
See application file for complete search history.

(56) References Cited

U.S. PATENT DOCUMENTS

| | | |
|---|---|---|
| 5,205,113 A | 4/1993 | Fassauer |
| 5,862,655 A | 1/1999 | Altamirano et al. |
| 5,894,715 A * | 4/1999 | Braun ..................... A01D 34/74 56/320.1 |
| 2018/0184584 A1* | 7/2018 | Song ..................... A01D 34/008 |
| 2019/0307065 A1* | 10/2019 | Hong .................... A01D 34/008 |

FOREIGN PATENT DOCUMENTS

| | | |
|---|---|---|
| CN | 103621244 A | 3/2014 |
| CN | 109601114 A | 4/2019 |
| CN | 109618646 A | 4/2019 |

(Continued)

OTHER PUBLICATIONS

Zhao (CN 103621244 A) English Translation—Mar. 12, 2014.*
Office Action and Search Report for Swedish Application No. 2050846-1 dated Feb. 15, 2021.

*Primary Examiner* — Thomas B Will
*Assistant Examiner* — Julia C Tran
(74) *Attorney, Agent, or Firm* — Burr & Forman LLP

(57) ABSTRACT

A lawn mower may include a cutter propulsion unit, a transmission axle that may have a longitudinal extension and may be adapted to be rotated by the cutter propulsion unit. The lawn mower may further include a cutting disc that may have a radial extension (R) that runs between a center and an outer edge, where the cutting disc may include one or more cutting edges that may be adapted to cut grass when the cutting disc may be brought into a rotational motion by means of the transmission axle. The cutting disc may further include a connection portion which may be adapted to receive a coupling member, which may be included in the transmission axle, in at least two different mounting positions that may be adapted to position the connection portion in mutually separated positions along the longitudinal extension (L, L').

15 Claims, 10 Drawing Sheets

(56) References Cited

FOREIGN PATENT DOCUMENTS

| | | | |
|---|---|---|---|
| CN | 10100563 | A | 8/2019 |
| CN | 110419318 | A | 11/2019 |
| CN | 110800453 | A | 2/2020 |
| CN | 110933986 | A | 3/2020 |
| EP | 531071 | A1 | 3/1993 |
| EP | 766911 | A1 | 4/1997 |
| EP | 3516940 | A2 | 7/2019 |
| WO | 2019013989 | A1 | 1/2019 |

\* cited by examiner

MEANS FOR ADJUSTING CUTTING HEIGHT OF A POWERED LAWN MOWER

TECHNICAL FIELD

The present disclosure relates to a powered lawn mower, for example a robotic lawn mower, where the cutting height can be easily adjusted by a user.

BACKGROUND

Grass cutting machines are for used for both domestic and commercial applications and can be powered using an electric motor or an internal combustion engine. A so-called rotary cutter employs a cutting member which is rotatable in a plane substantially parallel to the ground and about an axis which is normal to the ground, where the cutting member comprises an arm or a disc that is rotably supported in its center and has cutting edges arranged at its ends or its circumference.

Automated or robotic power tools such as robotic lawn mowers are becoming increasingly more popular. In a typical deployment a work area, such as a garden, the work area is enclosed by a boundary wire with the purpose of keeping the robotic lawn mower inside the work area. An electric control signal may be transmitted through the boundary wire thereby generating an (electro-)magnetic field emanating from the boundary wire. The robotic working tool is typically arranged with one or more sensors adapted to sense the control signal.

The robotic lawn mower can then cut grass on a user's lawn automatically and can be charged automatically without intervention of the user, and no longer needs to be manually managed after being set once. The robotic lawn mower typically comprises charging skids for contacting corresponding contact plates in a charging station when docking into the charging station for receiving a charging current through, and possibly also for transferring information by means of electrical communication between the charging station and the robotic lawn mower.

Most conventional lawn mowers include some means for adjusting the grass cutting height since different users like to cut their lawns to different lengths, and to cut different areas of their lawns to different lengths. This can depend on grow rate of the grass and the cutting frequency of a particular area, as well as on general user desires regarding height of cut grass.

Most lawn mowers includes means for providing an adjustable height of cutting height, for example wheels or rollers can be connected to a housing in a number of different positions, each position corresponding to a different height of cut, but requires a large number of components in order to adjust the height, and is thus expensive to manufacture.

Cutting height adjustment can also be made by inserting or removing spacers between the cutter blade and the drive shaft to which the cutter blade is fastened. The adjustment involves unbolting the blade from the drive shaft, inserting or removing spacers, and bolting the blade back onto the drive shaft. This operation is relatively cumbersome and time consuming, and requires spacers to be stored.

EP 531071 discloses displacing a cutting member against a compression spring so as to alter the height of cut of mown grass, and EP 766911 discloses displacing the chassis of a lawn mower to alter the height of cut of mown grass.

CN 103621244 discloses a mower with a cutterhead and a transmission part that is provided with a matching-connecting face which is connected with the cutterhead in a matched mode. The cutterhead is provided with a first installation face and a second installation face, one on each side of the cutter head, for abutting connection with the matching-connecting face. By turning the cutterhead around, a user can switch between two different cutting heights.

There is thus a need to provide improved and alternative means for an uncomplicated change of grass cutting height of a lawn mower in a more versatile and efficient manner than previously presented, needing lesser parts.

SUMMARY

The object of the present disclosure is to provide improved and alternative means for an uncomplicated change of grass cutting height of a lawn mower in a more versatile and efficient manner than previously presented, needing lesser parts.

This object is achieved by means of lawn mower comprising a cutter propulsion unit, a transmission axle that has a longitudinal extension and is adapted to be rotated by the cutter propulsion unit, and a cutting disc that has a radial extension that runs between a center and an outer edge. The cutting disc comprises one or more cutting edges that are adapted to cut grass when the cutting disc is brought into a rotational motion by means of the transmission axle. The cutting disc further comprises a connection portion which is adapted to receive a coupling member, comprised in the transmission axle, in at least two different mounting positions that are adapted to position the connection portion in mutually separated positions along the longitudinal extension.

This enables an uncomplicated change of grass cutting height of a lawn mower in a versatile and efficient manner, needing very few parts, and not needing any special parts to be stored.

According to some aspects, the connection portion comprises at least two engagement plateau arrangements which are mutually separated along a vertical extension that runs perpendicular to the radial extension. Each engagement plateau arrangement is adapted to receive a coupling member comprised in the transmission axle such that the cutting disc obtains a certain vertical position along the vertical extension in dependence of which engagement plateau arrangement that has received the coupling member, conferring an associated certain grass cutting height.

In this way, the forming of the cutting disc determines the number of grass cutting heights available. Different cutting discs may provide a different number of grass cutting heights, while the coupling member is uncomplicated and universal.

According to some aspects, at least one engagement plateau arrangements comprises two opposing surfaces against which the coupling member is adapted to rest.

This provides a secure and reliable contact between the coupling member and the cutting disc.

According to some aspects, the coupling member is adapted to be positioned between two opposing surfaces of at least one engagement plateau arrangement.

In this way, all mounting positions for the coupling member are easily accessible.

According to some aspects, each engagement plateau arrangement comprises at least one fastening aperture and the coupling member comprises at least one corresponding at least partially threaded bore. Each bore is adapted to receive a corresponding screw that runs via the corresponding fastening aperture and is adapted to secure the coupling member to the cutting disc.

This enables the coupling member to be easily secured to the cutting disc in a reliable and easily releasable manner.

According to some aspects, the connection portion comprises coherent arcuate wall portions that encompass surfaces of the engagement plateau arrangements against which the coupling member is adapted to rest.

This provides an efficient and durable design.

According to some aspects, the transmission axle comprises a coupling member which in turn comprises a first connection rod and a second connection rod. The second connection rod is adapted to be positioned closer to the cutter propulsion unit than the first connection rod. The connection portion comprises a first slot and a second slot, where the first slot is adapted to be positioned closer to the ground in a running condition than the second slot along a vertical extension that runs perpendicular to the radial extension. The first slot is adapted to receive the first connection rod and the second slot is adapted to receive both the first connection rod and the second connection rod.

This enables an easily handled change of grass cutting height.

According to some aspects, the coupling member is secured to the connection portion by means of screws that run via fastening apertures in the connection portion and are secured to the bores of the connection rod that is received in the second slot.

This enables the coupling member to be easily secured to the cutting disc in a reliable and easily releasable manner.

The present disclosure also relates to cutting discs and transmission axles that are associated with the above advantages.

BRIEF DESCRIPTION OF THE DRAWINGS

The present disclosure will now be described more in detail with reference to the appended drawings, where.

DETAILED DESCRIPTION

Figure 1A:
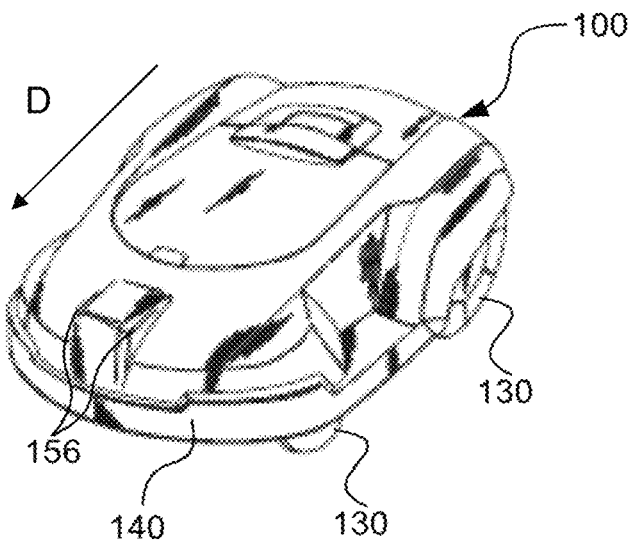
FIG. 1A shows a perspective side view of a robotic lawn mower.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

It should be noted that even though the description given herein will be focused on robotic lawn mowers, the teachings herein may also be applied to any type of lawn mower with a rotary cutter.

Figure 1B:
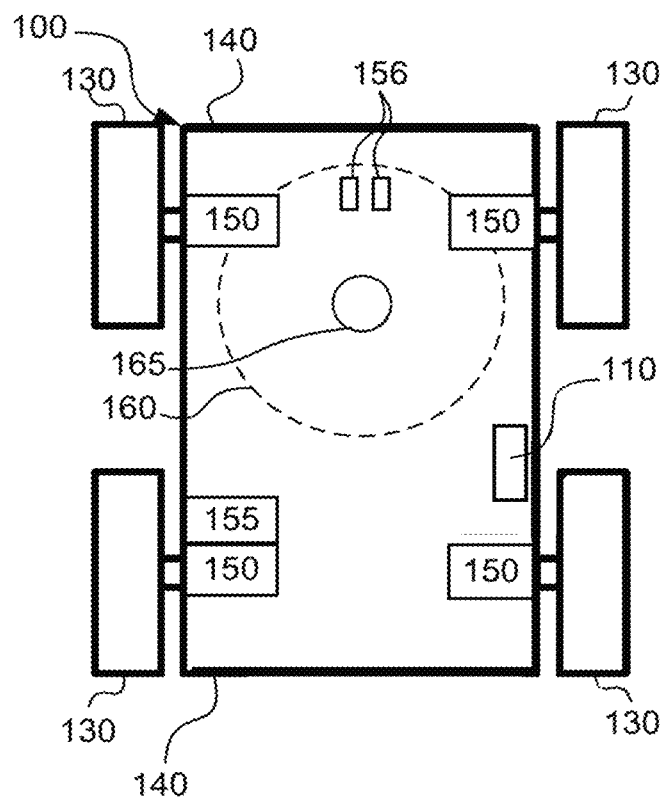
FIG. 1B shows a schematic overview of the robotic lawn mower.

FIG. 1A shows a perspective view of a robotic lawn mower 100 and FIG. 1B shows a schematic overview of the robotic lawn mower 100. The robotic lawn mower 100 is adapted for a forward travelling direction D, has a body 140 and a plurality of wheels 130; in this example the robotic lawn mower 100 has four wheels 130, two front wheels and two rear wheels. The robotic lawn mower 100 comprises a control unit 110 and at least one electric motor 150 that is comprised in an electric motor arrangement, where at least some of the wheels 130 are drivably connected to at least one electric motor 150. It should be noted that even if the description herein is focused on electric motors, combustion engines may alternatively be used in combination with an electric motor arrangement.

The robotic lawn mower 100 comprises charging skids 156 for contacting contact plates of a charging station (not shown) when docking into the charging station for receiving a charging current, and possibly also for transferring information by means of electrical communication between the charging station and the robotic lawn mower 100.

The robotic lawn mower 100 also comprises at least one rechargeable electric power source such as a battery 155 for providing power to the electric motor arrangement 150. The battery 155 is arranged to be charged by means of received charging current from the charging station, received through charging skids 156 or other suitable charging connectors.

The robotic lawn mower 100 also comprises a grass cutting device 160 driven by a cutter motor 165 that also is powered by the battery 155 or, alternatively, by a separate power source.

Figure 2A:
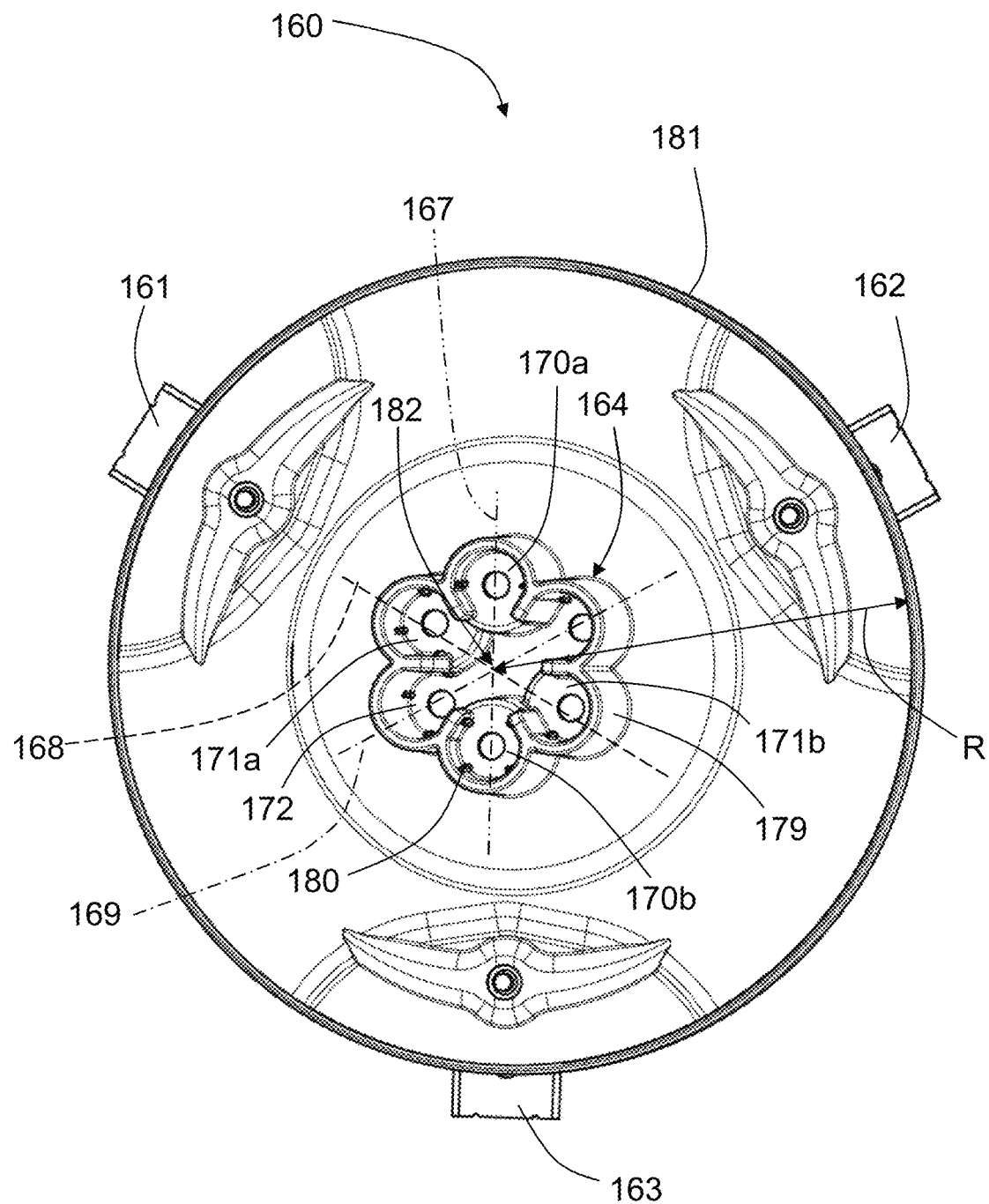
FIG. 2A shows a perspective top view of a cutting disc.
Figure 2B:
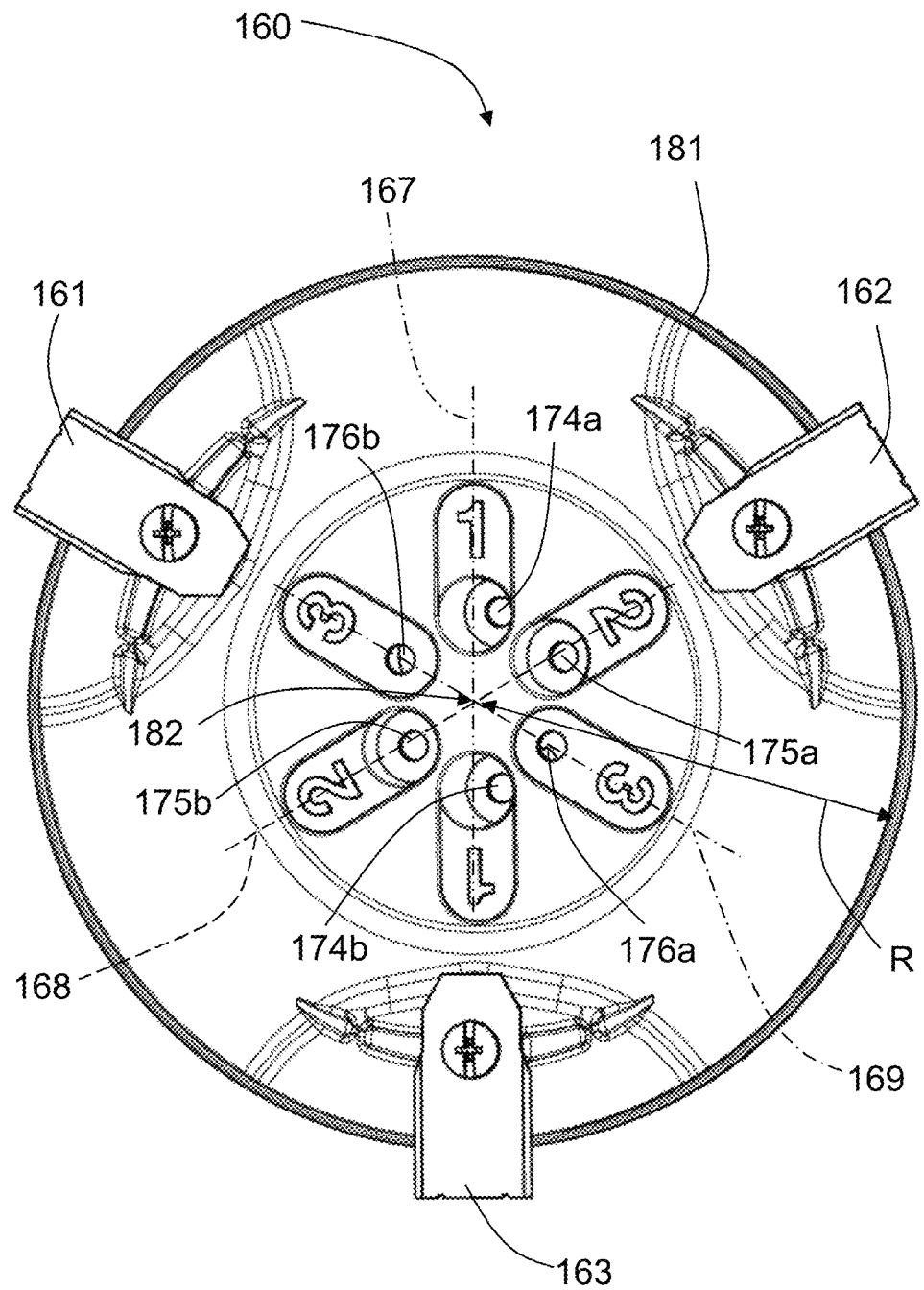
FIG. 2B shows a perspective bottom view of a cutting disc.
Figure 3:
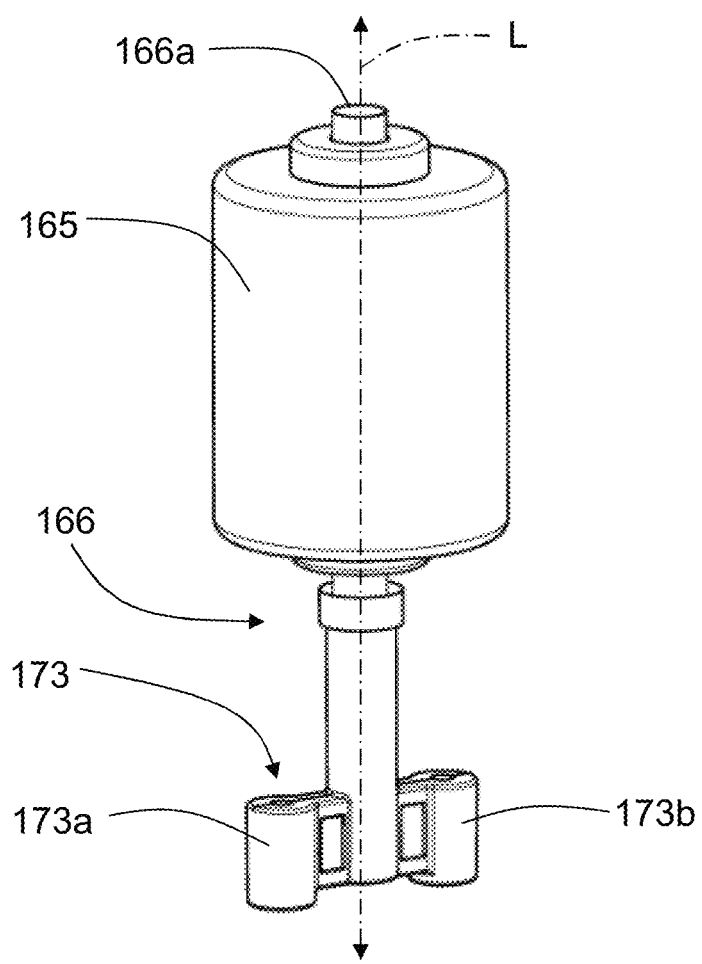
FIG. 3 shows a perspective side view of a cutter motor with a transmission axle.

In this example, as shown in FIG. 2A and FIG. 2B, the grass cutting device 160 is constituted by a cutting disc 160 that comprises a circumferentially running outer edge 181 and a plurality of cutting edges such as cutting knifes 161, 162, 163 arranged to protrude from the outer edge 181. With reference also to FIG. 3, the cutting disc 160 has a centrally located hub or connection portion 164 to which a transmission axle 166 is adapted to be connected. According to some aspects, each cutting knife 161, 162, 163 is pivotally arranged such that during normal operation they are maintained at a working position due to centripetal forces, radially extending outwards from the cutting disc's center 182. If an object that is more resilient than ordinary grass is encountered, the cutting knifes 161, 162, 163 are adapted to pivot, avoiding damage to both the object and the cutting knifes 161, 162, 163. Other types of cutting edges and number of cutting edges are of course conceivable. The transmission axle 166 has a longitudinal extension L and comprises a main axle part 166*a* and a coupling member 173, where the main axle part 166*a* is in the form of a rod that is adapted to be brought into rotation by means of the cutter motor 165.

According to the present disclosure, the connection portion 164 comprises a plurality of mounting positions for the transmission axle 166; a first mounting position that is indicated with a dash-double dotted line 167, a second mounting position that is indicated with a dashed line 168 and a third mounting position that is indicated with a dash-dotted line 169. The first mounting position 167 corresponds to a first grass cutting height, the second mounting position 168 corresponds to a second grass cutting height and the third mounting position 169 corresponds to a third grass cutting height, where the first grass cutting height falls below the second grass cutting height, and where the second grass cutting height falls below the third grass cutting height.

Each mounting position 167, 168, 169 is associated with a corresponding engagement plateau arrangement 170*a*, 170*b*; 171*a*, 171*b*, 172, the engagement plateau arrangements 170*a*, 170*b*; 171*a*, 171*b*, 172 being mutually separated along a vertical extension V that runs perpendicular to a radial extension R that runs between the center 182 and the outer edge 181. The vertical extension V also runs along the longitudinal extension L of the transmission axle 166 when the transmission axle 166 is mounted to the cutting disc 160.

Each engagement plateau arrangement 170*a*, 170*b*; 171*a*, 171*b*, 172 is adapted to receive the coupling member 173 that is comprised in the transmission axle 166, and to admit the coupling member 173 access to the other engagement plateau arrangements 170*a*, 170*b*; 171*a*, 171*b*, 172 such that the coupling member 173 can take all mounting positions 167, 168, 169. By letting the coupling member 163 engage the cutting disc 160 using a certain engagement plateau arrangement 170*a*, 170*b*; 171*a*, 171*b*, 172, a certain vertical position along the vertical extension V is obtained and thus an associated certain grass cutting height.

Figure 4A:
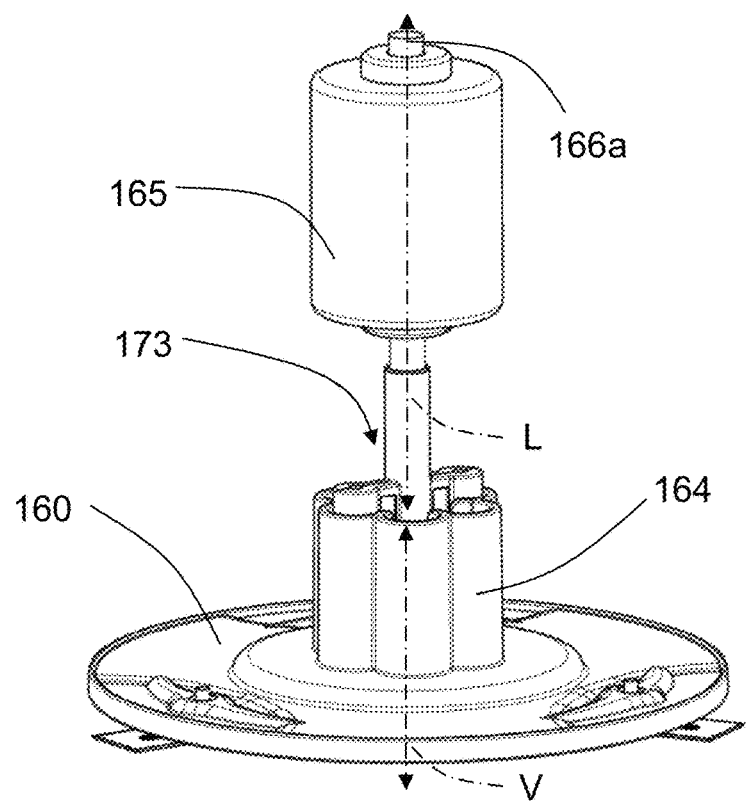
FIG. 4A shows a perspective side view of the cutter motor with the transmission axle connected to the cutting disc in a first mounting position.
Figure 4B:
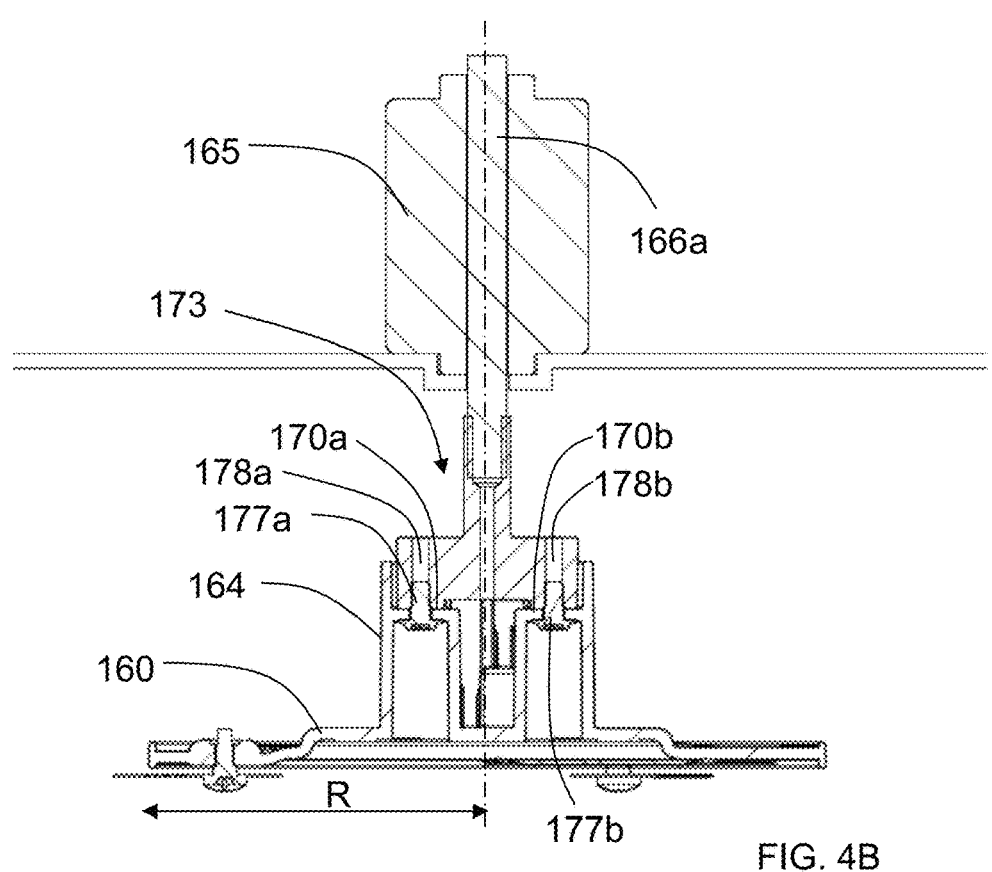
FIG. 4B shows a section side view of the cutter motor with the transmission axle connected to a cutting disc in the first mounting position.
Figure 5A:
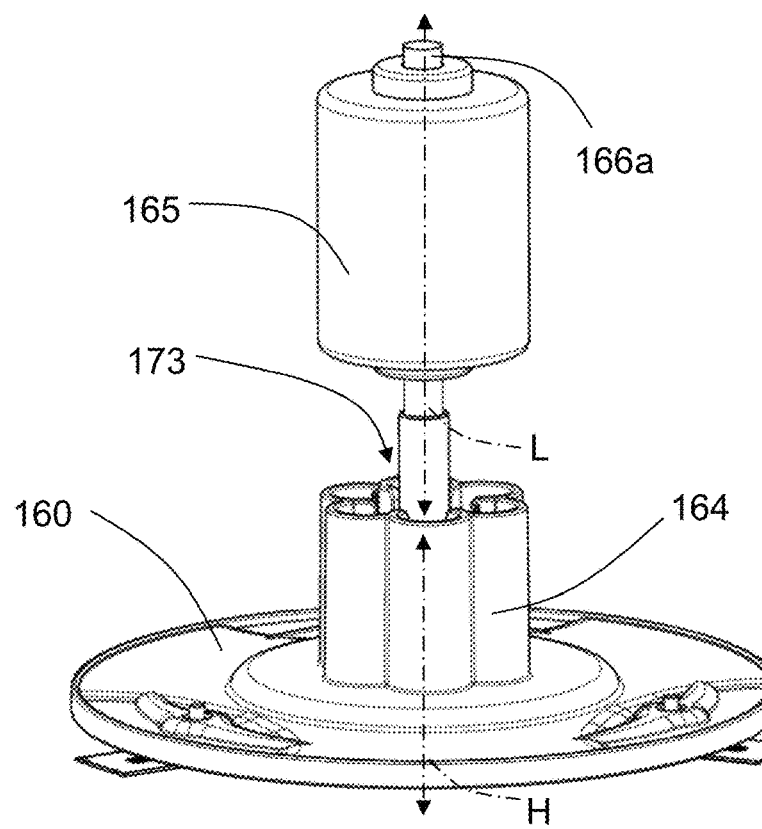
FIG. 5A shows a perspective side view of the cutter motor with the transmission axle connected to the cutting disc in a second mounting position.
Figure 5B:
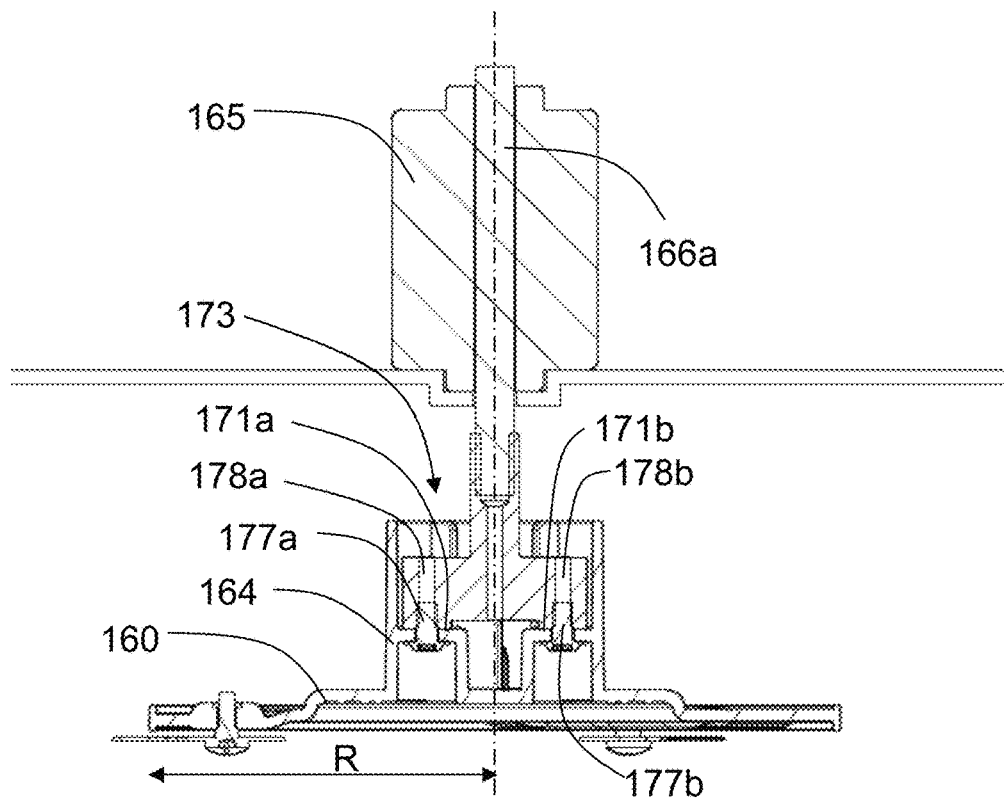
FIG. 5B shows a section side view of the cutter motor with the transmission axle connected to a cutting disc in the second mounting position.
Figure 6A:
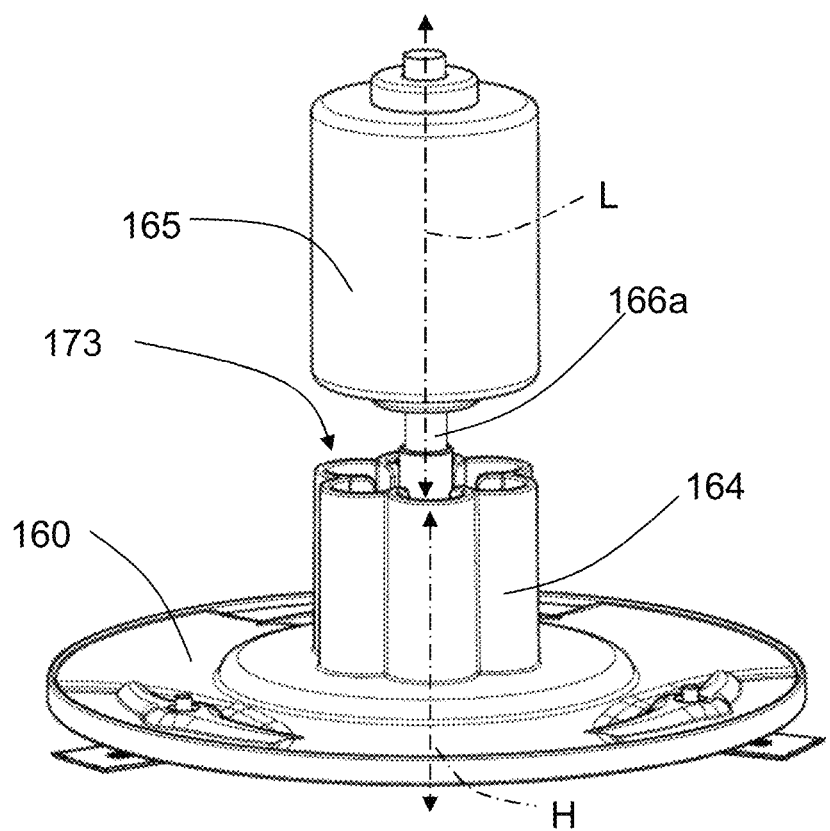
FIG. 6A shows a perspective side view of the cutter motor with the transmission axle connected to the cutting disc in a third mounting position.
Figure 6B:
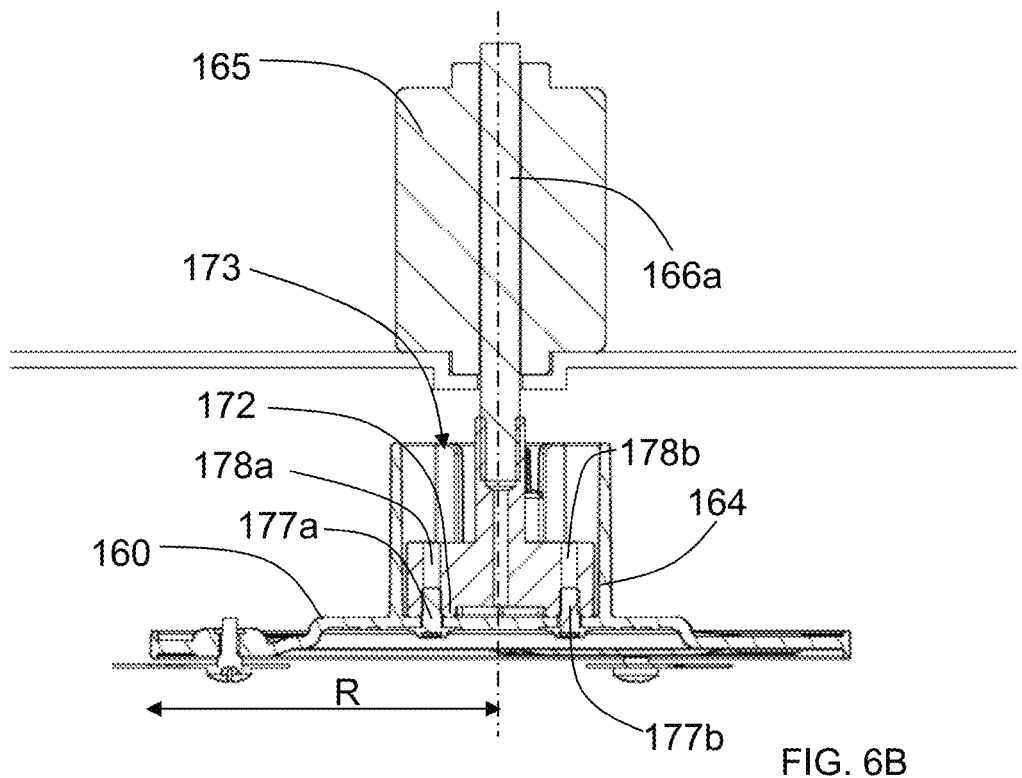
FIG. 6B shows a section side view of the cutter motor with the transmission axle connected to a cutting disc in the third mounting position.

In order to secure the coupling member 173 to a certain engagement plateau arrangement 170*a*, 170*b*; 171*a*, 171*b*, 172, each engagement plateau arrangement 170*a*, 170*b*; 171*a*, 171*b*, 172 comprises corresponding fastening apertures 174*a*, 174*b*; 175*a*, 175*b*; 176*a*, 176*b*. As shown in FIG. 4B, each fastening aperture 174*a*, 174*b*; 175*a*, 175*b*; 176*a*, 176*b* is adapted to receive a fastening means 177*a*, 177*b* such as a screw that secures the coupling member 173 to the cutting disc 160 at the chosen mounting position 167, 168, 169.

In the present example there are three mounting positions that will be described more in detail in the following.

With reference to FIG. 2A, FIG. 2B, FIG. 3, FIG. 4A and FIG. 4B, the coupling member 173 is mounted to the connection portion 164 in the first mounting position 167 and engages a first engagement plateau arrangement 170*a*, 170*b* that is constituted by two opposing surfaces against which the coupling member 173 rests and is secured by the screws 177*a*, 177*b*. The screws are secured in corresponding at least partly threaded bores 178*a*, 178*b* in the coupling member 173.

With reference to FIG. 2A, FIG. 2B, FIG. 3, FIG. 5A and FIG. 5B, the coupling member 173 is mounted to the connection portion 164 in the second mounting position 168 and engages a second engagement plateau arrangement 171*a*, 171*b* that is constituted by two opposing surfaces against which the coupling member 173 rests and is secured by the screws 177*a*, 177*b* which in turn are secured in the bores 178*a*, 178*b*. The coupling member 173 is here positioned between the two opposing surfaces of the first engagement plateau arrangement 170*a*, 170*b*.

With reference to FIG. 2A, FIG. 2B, FIG. 3, FIG. 6A and FIG. 6B, the coupling member 173 is mounted to the connection portion 164 in the third mounting position 169 and engages a third engagement plateau arrangement 172 that is constituted by an inner bottom surface of the connection portion 164, against which the coupling member 173 rests and is secured by the screws 177*a*, 177*b* which in turn are secured in the bores 178*a*, 178*b*. The coupling member 173 is here positioned between the opposing surfaces of the both the first engagement plateau arrangement 170*a*, 170*b* and the second engagement plateau arrangement 171*a*, 171*b*.

Three different grass cutting heights are thus easily achieved by switching between the above mounting positions 167, 168, 169, while the cutter motor 165 can remain fixed to the body 140 or an internal frame, reducing the number of parts and complexity.

The present disclosure is not limited to the above, but may vary freely within the scope of the appended claims. For example, the connection portion 164 is shown to comprise coherent arcuate wall portions 179 (only one indicated in FIG. 2A for reasons of clarity) that encompass the surfaces of the engagement plateau arrangements 170*a*, 170*b*, 171*a*, 171*b*, 172, where opposing surfaces of the first two engagement plateau arrangements 170*a*, 170*b*, 171*a*, 171*b* are shown circular. These shapes are only an example, and other suitable shapes, such as rectangular or other straight shapes, can of course be used instead. The encompassing wall that in this example is formed by the wall parts 179 can be omitted and necessary guidance for the coupling member 173 can be provided by the screws 177*a*, 177*b* only or in combination with some other guiding means.

As shown in FIG. 3, in the case of opposing surfaces of the first two engagement plateau arrangements 170*a*, 170*b*, 171*a*, 171*b* being circular or oval, the coupling member 173 comprises two cylindrical members 173*a*, 173*b* positioned on opposite sides of the longitudinal extension L, each cylindrical member 173*a*, 173*b* having an axial extension that is parallel to the longitudinal extension L and being formed to correspond to the plateau arrangements 170*a*, 170*b*, 171*a*, 171*b*.

Example of other types of guidance means are different types of wall parts and/or slots that correspond to protrusions of the coupling member 173. In this example, four guiding pins 180 (only one indicated in FIG. 2A for reasons of clarity) are provided for each engagement plateau arrangement 170*a*, 170*b*, 171*a*, 171*b*, 172, providing a reliable attachment of the coupling member 173.

In the examples provided there are three engagement plateau arrangements 170*a*, 170*b*, 171*a*, 171*b*, 172, but there can of course be any suitable number of engagement plateau arrangement. There are at least two engagement plateau arrangements.

Figure 7:
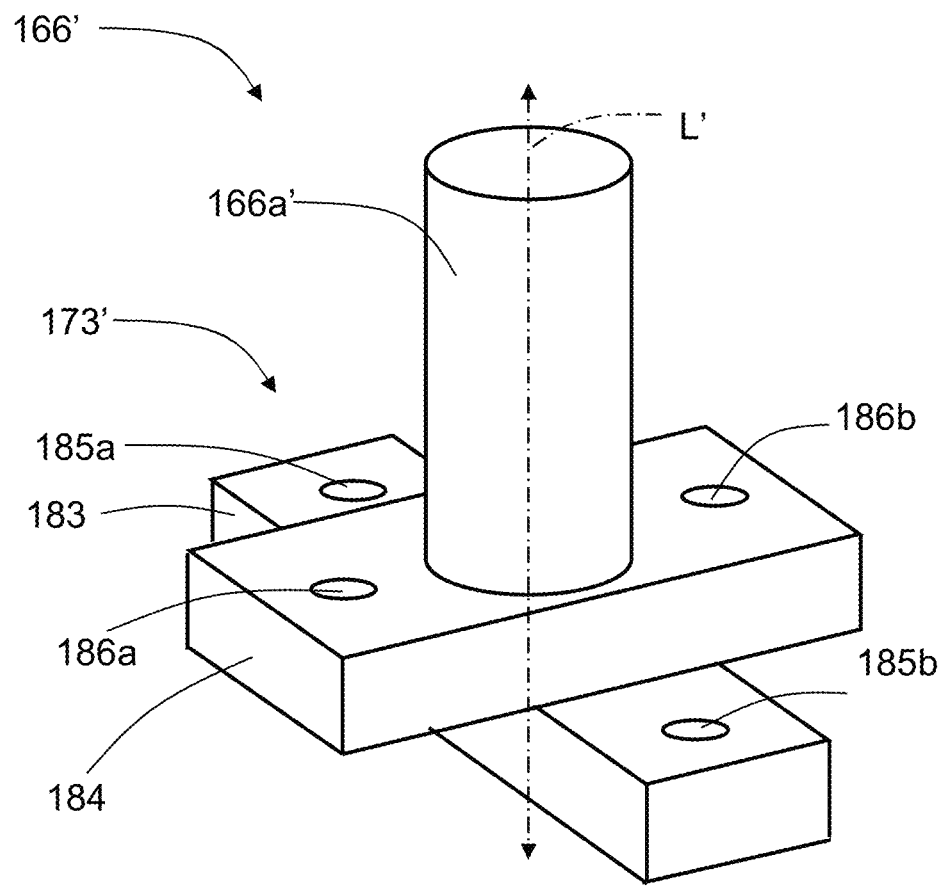
FIG. 7 shows a schematic perspective side view of a transmission axle according to a further example.

Other types of plateau arrangements are of course conceivable, for example the coupling member can comprise different plateaus. An further example illustrating another type of plateau arrangement will now be discussed with reference to FIG. 7, FIG. 8, FIG. 9, FIG. 10A and FIG. 10B. FIG. 7 shows a schematic perspective side view of an alternative transmission axle 166' that has a longitudinal extension L' and comprises a transmission axle rod 166a' and a coupling member 173'. The coupling member 173' comprises a first connection rod 183 and a second connection rod 184, where the second connection rod 184 is adapted to be positioned closer to the cutter motor than the first connection rod 183. According to some aspects, each connection rod 183, 184 comprises two at least partly threaded bores 185a, 185b, 186a, 186b. According to some further aspects, the connection rods 183, 184 run mutually perpendicular to each other, forming a cross-shaped coupling member 173'.

Figure 8:
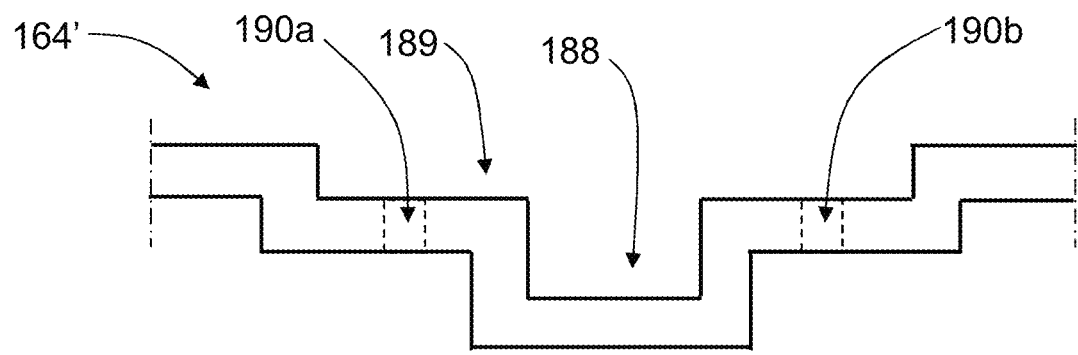
FIG. 8 shows a schematic cut-open side view of a cutting disc connection portion according to the further example.
Figure 9:
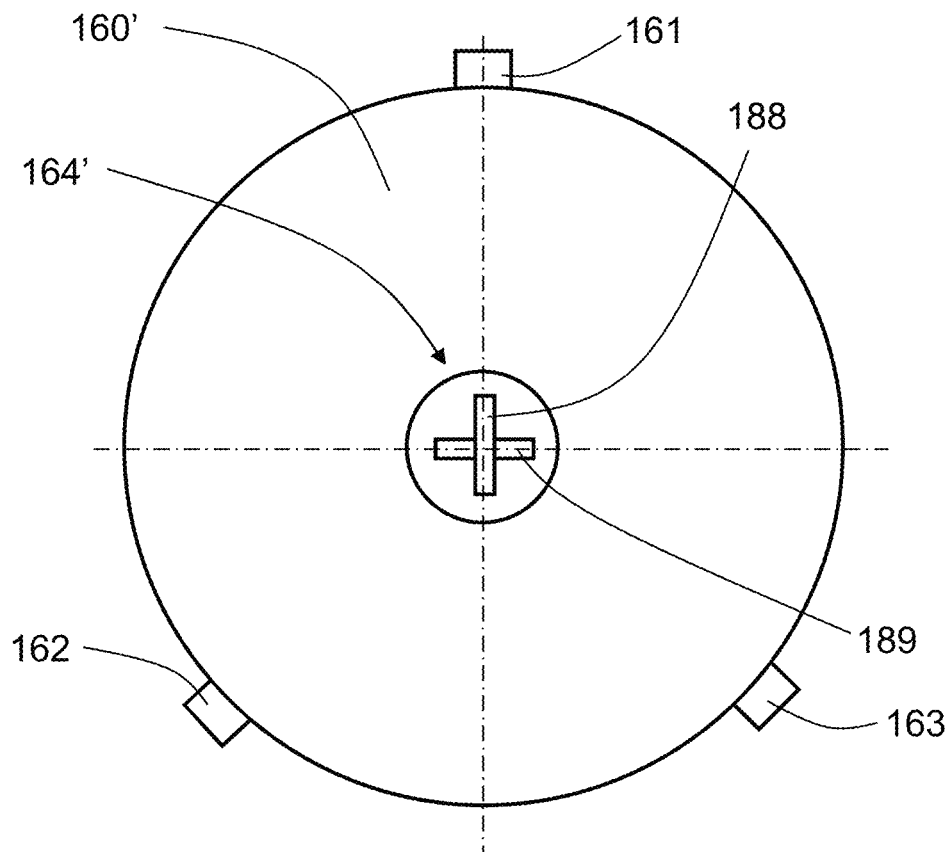
FIG. 9 shows a schematic top view of the cutting disc according to the further example.

FIG. 8 shows a schematic cut-open side view of a connection portion 164' comprised in a cutting disc, and FIG. 9 shows a top view of the cutting disc 160' with the connection portion 164'. The connection portion 164' in turn comprises a first slot 188 and a second slot 189, where the first slot 188 is adapted to be positioned closer to the ground in a running condition than the second slot 189, along the vertical extension. The first slot 188 is adapted to receive the first connection rod 183 and the second slot 189 is adapted to receive both the first connection rod 183 and a second connection rod 184.

Figure 10A:
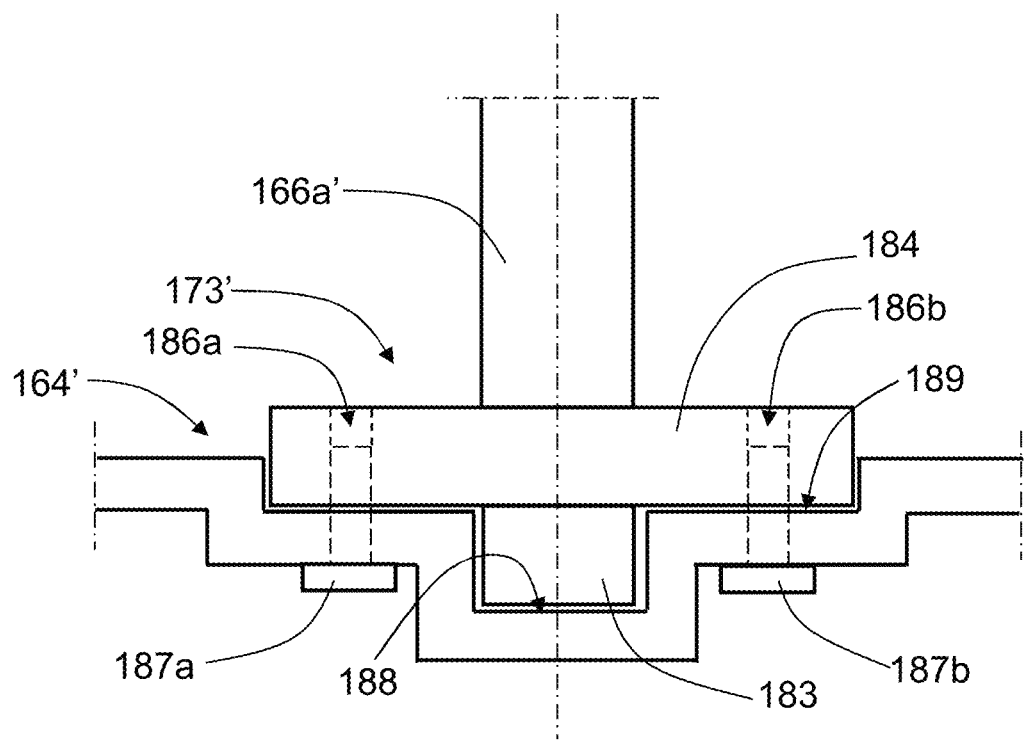
FIG. 10a shows a schematic cut-open side view of the transmission axle and the connection portion in a first mounting position.

In FIG. 10A, showing a schematic cut-open side view of the transmission axle 166' and the connection portion 164', the coupling member 173' is mounted to the connection portion 164' in a first mounting position where the first connection rod 183 is positioned in the first slot 188 and the second connection rod 184 is positioned in the second slot 189. According to some aspects, the coupling member 173' is secured to the connection portion 164' by means of screws 187a, 187b that are secured to the bores 186a, 186b in the second connection rod 184.

Figure 10B:
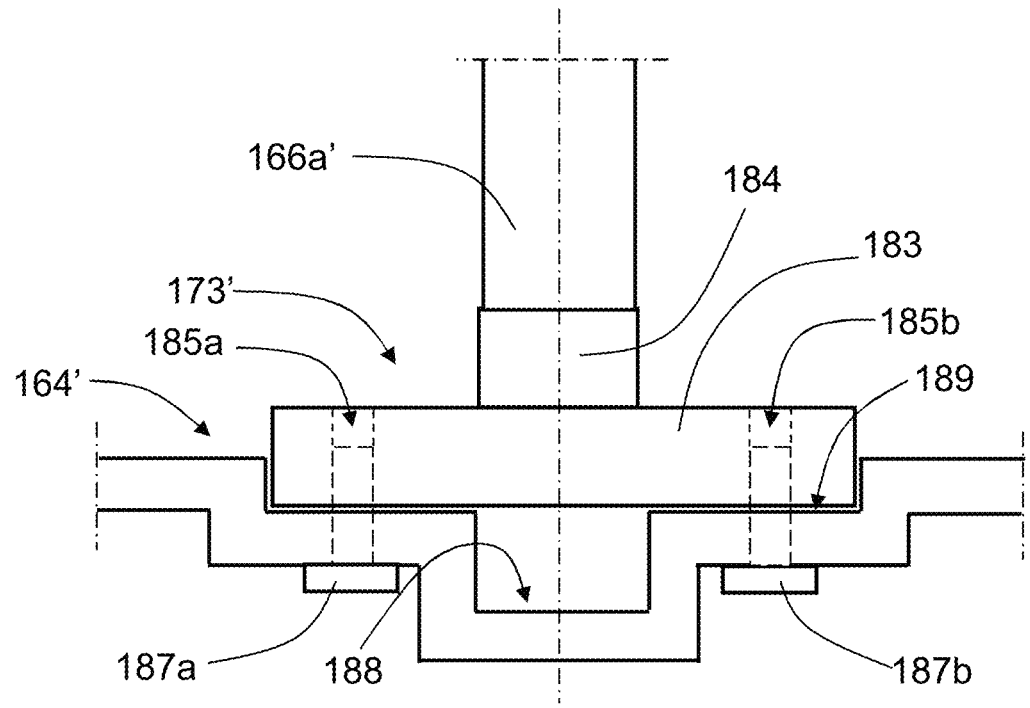
FIG. 10b shows a schematic cut-open side view of the transmission axle and the connection portion in a first mounting position.

In FIG. 10B, that corresponds to FIG. 10A, the coupling member 173' is mounted to the connection portion 164' in a second mounting position where the first slot 188 is empty and the first connection rod 183 is positioned in the second slot 189. According to some aspects, the coupling member 173' is secured to the connection portion 164' by means of screws 187a, 187b that run via fastening apertures 190a, 190b in the connection portion 164' and are secured to the bores 185a, 185b in the first connection rod 183.

The first mounting position corresponds to a first grass cutting height and the second mounting position corresponds to a second grass cutting height where the first grass cutting height exceeds the second grass cutting height.

Generally, the present disclosure relates to a lawn mower 100 comprising a cutter propulsion unit 165, a transmission axle 166, 166' that has a longitudinal extension L, L' and is adapted to be rotated by the cutter propulsion unit 165, and a cutting disc 160 that has a radial extension R that runs between a center 182 and an outer edge 181. The cutting disc 160 comprises one or more cutting edges 161, 162, 163 that are adapted to cut grass when the cutting disc 160 is brought into a rotational motion by means of the transmission axle 166. The cutting disc 160 further comprises a connection portion 164, 164' which is adapted to receive a coupling member 173, 173', comprised in the transmission axle 166, 166', in at least two different mounting positions that are adapted to position the connection portion 164 in mutually separated positions along the longitudinal extension L, L'.

According to some aspects, the connection portion 164 comprises at least two engagement plateau arrangements 170a, 170b; 171a, 171b; 172 which are mutually separated along a vertical extension V that runs perpendicular to the radial extension R. Each engagement plateau arrangement 170a, 170b; 171a, 171b, 172 is adapted to receive a coupling member 173 comprised in the transmission axle 166 such that the cutting disc obtains a certain vertical position along the vertical extension V in dependence of which engagement plateau arrangement 170a, 170b; 171a, 171b, 172 that has received the coupling member 173, conferring an associated certain grass cutting height.

According to some aspects, at least one engagement plateau arrangements 170a, 170b; 171a, 171b comprises two opposing surfaces against which the coupling member 173 is adapted to rest.

According to some aspects, the coupling member 173 is adapted to be positioned between two opposing surfaces of at least one engagement plateau arrangement 170a, 170b; 171a, 171b.

According to some aspects, each engagement plateau arrangement 170a, 170b, 171a, 171b, 172 comprises at least one fastening aperture 174a, 174b; 175a, 175b; 176a, 176b, where the coupling member 173 comprises at least one corresponding at least partially threaded bore 178a, 178b, each bore 178a, 178b being adapted to receive a corresponding screw 177a, 177b that runs via the corresponding fastening aperture 174a, 174b; 175a, 175b; 176a, 176b and is adapted to secure the coupling member 173 to the cutting disc 160.

According to some aspects, the connection portion 164 comprises coherent arcuate wall portions 179 that encompass surfaces of the engagement plateau arrangements 170a, 170b, 171a, 171b, 172 against which the coupling member 173 is adapted to rest.

According to some aspects, the transmission axle 166' comprises a coupling member 173' which in turn comprises a first connection rod 183 and a second connection rod 184, where the second connection rod 184 is adapted to be positioned closer to the cutter propulsion unit 165 than the first connection rod 183, where the connection portion 164 comprises a first slot 188 and a second slot 189, where the first slot 188 is adapted to be positioned closer to the ground in a running condition than the second slot 188 along a vertical extension V that runs perpendicular to the radial extension R, where the first slot 188 is adapted to receive the first connection rod 183 and the second slot 189 is adapted to receive both the first connection rod 183 and the second connection rod 184.

According to some aspects, the coupling member 173' is secured to the connection portion 164' by means of screws 187a, 187b that run via fastening apertures 190a, 190b in the connection portion 164' and are secured to the bores 185a, 185b of the connection rod 183, 184 that is received in the second slot 189.

Screws are shown to be used for securing the coupling member 173, 173' to the cutting disc 160 160', other arrangements are of course conceivable. For example locking pins, extending perpendicular to the vertical extension, can be used.

In the case of screws, one or more screws can be used for each engagement plateau arrangement 170a, 170b; 171a, 171b, 172 or connection rod 183, 184. Instead of threaded bores, the bores can be without threads and the screws secured by means of separate locking nuts.

The cutter motor is generally constituted by a cutter propulsion unit 165.

The present disclosure also relates to a lawn mower cutting disc 160 that has a radial extension R that runs between a center 182 and an outer edge 181 and comprises one or more cutting edges 161, 162, 163 that are adapted to cut grass when the cutting disc 160 is brought into a rotational motion by means of a transmission axle 166, 166' that has a longitudinal extension L, L'. The cutting disc 160 further comprises a connection portion 164, 164' which is adapted to receive a coupling member 173, 173', comprised in the transmission axle 166, 166', in at least two different mounting positions that are adapted to position the connection portion 164 in mutually separated positions along the longitudinal extension L, L'.

According to some aspects, the connection portion 164 comprises at least two engagement plateau arrangements 170a, 170b; 171a, 171b; 172 which are mutually separated along a vertical extension V that runs perpendicular to the radial extension R, where each engagement plateau arrangement 170a, 170b; 171a, 171b, 172 is adapted to receive a coupling member 173 comprised in the transmission axle 166 such that the cutting disc can obtain a certain vertical position along the vertical extension V in dependence of which engagement plateau arrangement 170a, 170b; 171a, 171b, 172 that has received the coupling member 173.

According to some aspects, at least one engagement plateau arrangements 170a, 170b; 171a, 171b comprises two opposing surfaces against which the coupling member 173 is adapted to rest.

According to some aspects, the connection portion 164 is adapted to receive the coupling member 173 between two opposing surfaces of at least one engagement plateau arrangement 170a, 170b; 171a, 171b.

According to some aspects, each engagement plateau arrangement 170a, 170b, 171a, 171b, 172 comprises at least one fastening aperture 174a, 174b; 175a, 175b; 176a, 176b adapted to admit a screw to pass, enabling the coupling member 173 to be secured to the lawn mower cutting disc 160.

According to some aspects, the connection portion 164 comprises coherent arcuate wall portions 179 that encompass surfaces of the engagement plateau arrangements 170a, 170b, 171a, 171b, 172.

According to some aspects, the connection portion 164' comprises a first slot 188 and a second slot 189, where, in a running condition, the first slot 188 is adapted to be positioned closer to the ground than the second slot 188 along a vertical extension V that runs perpendicular to the radial extension R, where the first slot 188 is adapted to receive a first connection rod 183 and the second slot 189 is adapted to receive both the first connection rod 183 and a second connection rod 184, the connection rods 183, 184 being comprised in the transmission axle 166'.

The present disclosure also relates to a lawn mower transmission axle 166, 166' that has a longitudinal extension L, L' and comprises a transmission axle rod 116a, 166a' and a coupling member 173, 173'. The transmission axle rod 116a, 166a' is adapted to be rotated by a cutter propulsion unit 165 and the coupling member 173, 173' is adapted to be received by a lawn mower cutting disc connection portion 164, 164' in at least two different mounting positions that are adapted to position the connection portion 164, 164' in mutually separated positions along the longitudinal extension L, L'.

According to some aspects, the coupling member 173 comprises two cylindrical members 173a, 173b positioned on opposite sides of the longitudinal extension L. Each cylindrical member 173a, 173b has an axial extension that is parallel to the longitudinal extension L and is formed to correspond to plateau arrangements 170a, 170b, 171a, 171b comprised in the connection portion 164.

According to some aspects, the coupling member 173' comprises a first connection rod 183 and a second connection rod 184, where the second connection rod 184 is adapted to be positioned closer to the cutter propulsion unit 165 than the first connection rod 183. The first connection rod 183 is adapted to be received in a first slot 188 in the connection portion 164' and the second connection rod 184 is adapted to be received in a second slot 189 in the connection portion 164'.

Although the description above has been directed to a robotic lawn mower, the present disclosure is applicable for any type of lawn mower with at least one motor-powered cutting disc such as for example a robotic lawn mower, a hand-moved lawn mower with or without motor-powered wheels, as well as a riding mower.

The invention claimed is:

1. A lawn mower comprising:
a cutter propulsion unit,
a transmission axle adapted to be rotated by the cutter propulsion unit, the transmission axle comprising a longitudinal extension and a coupling member, and
a cutting disc comprising a radial extension that runs between a center and an outer edge of the cutting disc,
wherein the cutting disc comprises one or more cutting edges adapted to cut grass when the cutting disc is brought into-a rotational motion via the transmission axle and the cutter propulsion unit,
wherein the cutting disc further comprises a connection portion adapted to receive the coupling member, in at least two different mounting positions radially separated around the longitudinal extension,
wherein the at least two different mounting positions comprises at least two engagement plateau arrangements which are radially separated around a vertical extension that is coaxial with the longitudinal extension and perpendicular to the radial extension, and
wherein each of the engagement plateau arrangements comprises two opposing surfaces mutually separated opposite the vertical extension from each other, against which the coupling member is adapted to rest, and
wherein the two opposing surfaces of the each of the engagement plateau arrangements are disposed in a same plane to define a certain grass cutting height of the cutting disc.

2. The lawn mower according to claim 1, wherein each engagement plateau arrangement is adapted to receive the coupling member comprised in the transmission axle in the two opposing surfaces such that the cutting disc obtains a certain vertical position along the vertical extension in dependence of which engagement plateau arrangement that has received the coupling member, corresponding to the certain grass cutting height.

3. The lawn mower according to claim 1, wherein the coupling member is adapted to be in contact with the two opposing surfaces of at least one engagement plateau arrangement simultaneously.

4. The lawn mower according to claim 1, wherein each engagement plateau arrangement comprises at least one fastening aperture, wherein the coupling member comprises at least one corresponding at least partially threaded bore, each bore being adapted to receive a corresponding screw that runs via the corresponding fastening aperture and is adapted to secure the coupling member to the cutting disc.

5. The lawn mower according to claim 1, wherein the connection portion comprises coherent arcuate wall portions that encompass surfaces of the engagement plateau arrangements against which the coupling member is adapted to rest.

6. The lawn mower according to claim 1, the coupling member comprises a first connection rod and a second connection rod, wherein the second connection rod is adapted to be positioned closer to the cutter propulsion unit than the first connection rod, wherein the connection portion comprises a first slot and a second slot, wherein the first slot is adapted to be positioned closer to the ground in a running condition than the second slot along a vertical extension that runs perpendicular to the radial extension, wherein the first slot is adapted to receive the first connection rod and the second slot is adapted to receive both the first connection rod and the second connection rod.

7. The lawn mower according to claim 6, wherein the coupling member is secured to the connection portion by means of screws that run via fastening apertures in the connection portion and are secured to corresponding at least partially threaded bores of the connection rod that is received in the second slot.

8. A lawn mower cutting disc comprising:
a radial extension that runs between a center and an outer edge, and
one or more cutting edges adapted to cut grass when the cutting disc is brought into rotational motion via a transmission axle comprising a longitudinal extension and a coupling member,
wherein the cutting disc further comprises a connection portion adapted to receive the coupling member, in at least two different mounting positions radially separated around the longitudinal extension,
wherein the at least two different mounting positions comprises at least two engagement plateau arrangements radially separated around a vertical extension that runs is coaxial with the longitudinal extension and perpendicular to the radial extension, and
wherein each of the engagement plateau arrangements comprises two opposing surfaces mutually separated opposite the vertical extension from each other, against which the coupling member is adapted to rest, and
wherein the two opposing surfaces of the each of the engagement plateau arrangements are disposed in a same plane to define a certain grass cutting height of the cutting disc.

9. The lawn mower cutting disc according to claim 8, wherein each engagement plateau arrangement is adapted to receive the coupling member comprised in the transmission axle such that the cutting disc can obtain a certain vertical position along the vertical extension in dependence of which engagement plateau arrangement that has received the coupling member, corresponding to the certain grass cutting height.

10. The lawn mower cutting disc according to claim 8, wherein the coupling member is in contact with the two opposing surfaces of at least one engagement plateau arrangement simultaneously within the connection portion.

11. The lawn mower cutting disc according to claim 8, wherein each engagement plateau arrangement comprises at least one fastening aperture adapted to admit a screw to pass, enabling the coupling member to be secured to the lawn mower cutting disc.

12. The lawn mower cutting disc according to claim 8, wherein the connection portion comprises coherent arcuate wall portions that encompass surfaces of the engagement plateau arrangements.

13. The lawn mower cutting disc according to claim 8, wherein the connection portion comprises a first slot and a second slot, wherein, in a running condition, the first slot is adapted to be positioned closer to the ground than the second slot along a vertical extension that runs perpendicular to the radial extension, wherein the first slot is adapted to receive a first connection rod and the second slot is adapted to receive both the first connection rod and a second connection rod, the connection rods being comprised in the transmission axle.

14. A lawn mower transmission axle comprising:
a transmission axle rod comprising a longitudinal extension and a coupling member,
wherein the transmission axle rod is adapted to be rotated about the longitudinal extension by a cutter propulsion unit,
wherein the coupling member is adapted to operably couple to a lawn mower cutting disc via a connection portion of the cutting disc comprising at least two different mounting positions radially separated around the longitudinal extension,
wherein the coupling member comprises two cylindrical members disposed on opposite sides of the longitudinal extension from each other, each cylindrical member comprising an axial extension that is parallel to the longitudinal extension,
wherein the at least two different mounting positions comprise at least two engagement plateau arrangements radially separated around a vertical extension that is coaxial with the longitudinal extension,
wherein each of the engagement plateau arrangements comprises two opposing surfaces disposed on opposite sides of a vertical extension from each other, against which the two cylindrical members are adapted to rest, and
wherein the two opposing surfaces of the each of the engagement plateau arrangements are disposed in a same plane to define a certain grass cutting height of the cutting disc.

15. The transmission axle according to claim 14, wherein the coupling member comprises a first connection rod and a second connection rod, wherein the second connection rod is adapted to be positioned closer to the cutter propulsion unit than the first connection rod, the first connection rod being adapted to be received in a first slot in the connection portion and the second connection rod being adapted to be received in a second slot in the connection portion.

* * * * *

UNITED STATES PATENT AND TRADEMARK OFFICE
CERTIFICATE OF CORRECTION

PATENT NO. : 11,844,308 B2
APPLICATION NO. : 17/363960
DATED : December 19, 2023
INVENTOR(S) : Jonathan Björn It is certified that error appears in the above-identified patent and that said Letters Patent is hereby corrected as shown below:

In the Claims

In Column 10, Claim 1, Line 30, "into-a" should read --into--

In Column 10, Claim 1, Line 37, "comprises" should read --comprise--

In Column 11, Claim 8, Line 35, "comprises" should read --comprise--

In Column 11, Claim 8, Line 37, "that runs is coaxial" should read --that is coaxial--

Signed and Sealed this
Twenty-sixth Day of March, 2024

*Katherine Kelly Vidal*

Katherine Kelly Vidal
*Director of the United States Patent and Trademark Office*